United States Patent [19]

Bush

[11] 4,021,214

[45] May 3, 1977

[54] TRANSMISSION POWERED AIR CONDITIONER COMPRESSORS

[76] Inventor: Willard Carl Bush, P.O. Box 28245, Dallas, Tex. 75228

[22] Filed: Apr. 11, 1975

[21] Appl. No.: 567,065

[52] U.S. Cl. .................................. 62/244; 62/323; 62/510
[51] Int. Cl.² ................................... B60H 3/04
[58] Field of Search ............ 62/323, 239, 241, 242, 62/244

[56] References Cited

UNITED STATES PATENTS

| | | |
|---|---|---|
| 2,194,530 | 3/1940 | Torstensson ........................ 62/241 |
| 2,910,840 | 11/1959 | Miller ............................. 62/323 X |
| 3,459,006 | 8/1969 | Hoyer ............................. 62/323 X |
| 3,827,250 | 8/1974 | Kerschbaumer et al. ....... 62/510 X |

*Primary Examiner*—William E. Wayner
*Assistant Examiner*—William E. Tapolcai, Jr.

[57] ABSTRACT

An apparatus for being installed within a truck or bus vehicle, the apparatus consisting of a pair of air conditioner compressors and a power take-off drive for the compressors which takes power from a transmission located on the truck or bus chassis.

3 Claims, 2 Drawing Figures

TRANSMISSION POWERED AIR CONDITIONER COMPRESSORS

This invention relates generally to automotive truck and bus vehicles. More specifically it relates to a truck and bus air conditioning apparatus.

It is generally well known to those skilled in the particular art that heretofore the air conditioner compressors mounted on an automotive truck or bus have been powered by attaching a pulley to the crank shaft located ahead of the harmonica balancer. The disadvantage of such installation is that the compressors, belts and pulleys are located within the engine compartment which is generally very crowded due to the presence of power steering and air brake compressors and belts. This situation is of course objectionable and therefore in want of an improvement.

Accordingly it is a principal object of the invention to provide a transmission powered air conditioner compressor apparatus which overcomes the above indicated objection by being installed under and around the transmission of a truck or bus rather than in the engine compartment.

Another object of the present invention is to provide a transmission powered air conditioner compressors apparatus which accordingly is located where there is more space for servicing the same, while at the same time keeping the engine compartment no further overcrowded than at present.

Yet another object of the present invention is to provide a transmission powered air conditioner compressors apparatus which is more exposed to view for being inspected at times of a maintenance check.

Other objects are to provide a transmission powered air conditioner compressors apparatus which is simple in design, inexpensive to manufacture, rugged in construction, easy to use and efficient in operation.

These and other objects will be readily evident upon a study of the following specification and the accompanying drawing wherein.

Figure 1:
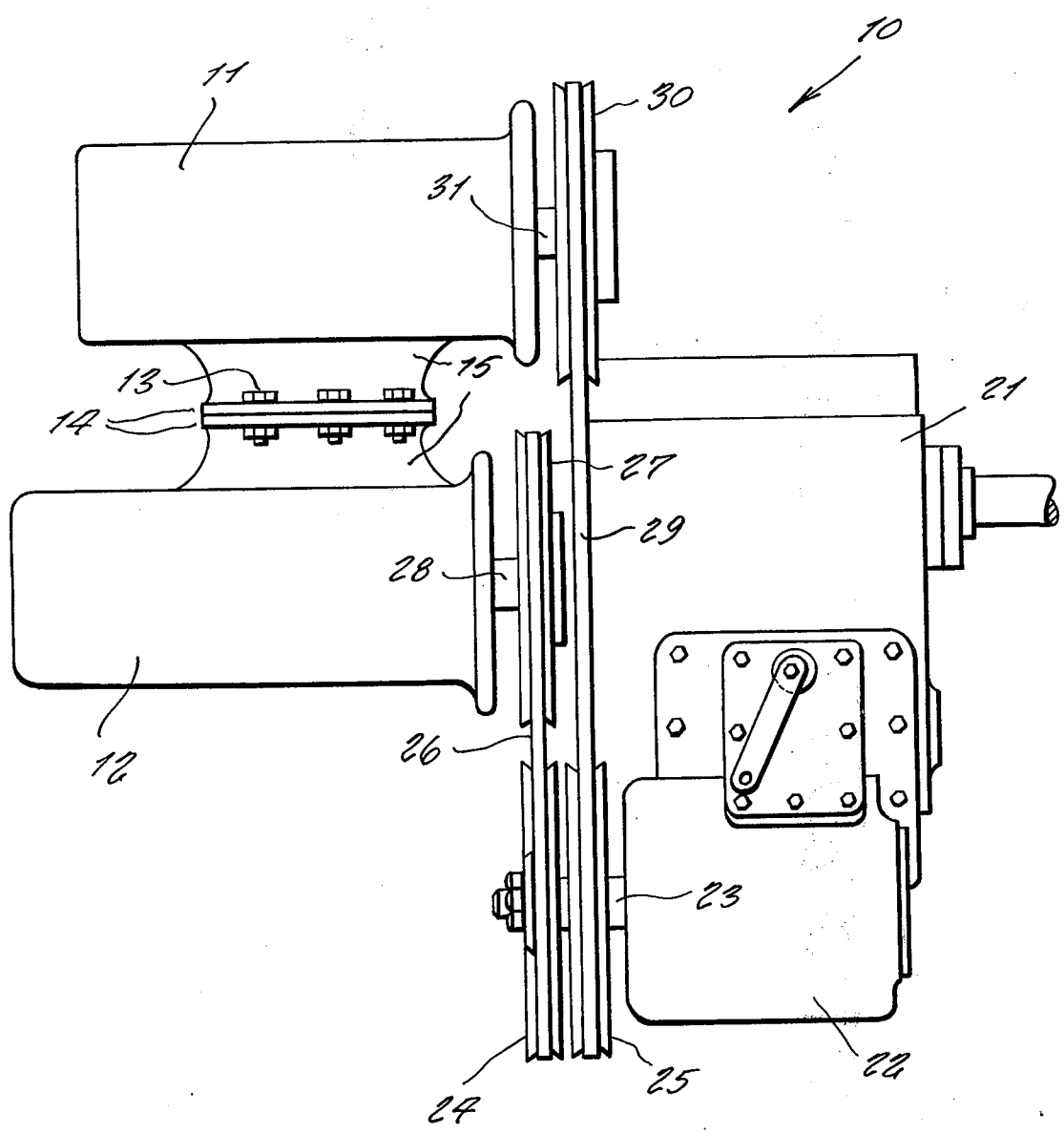
FIG. 1 is a side elevation view of the present invention.
Figure 2:
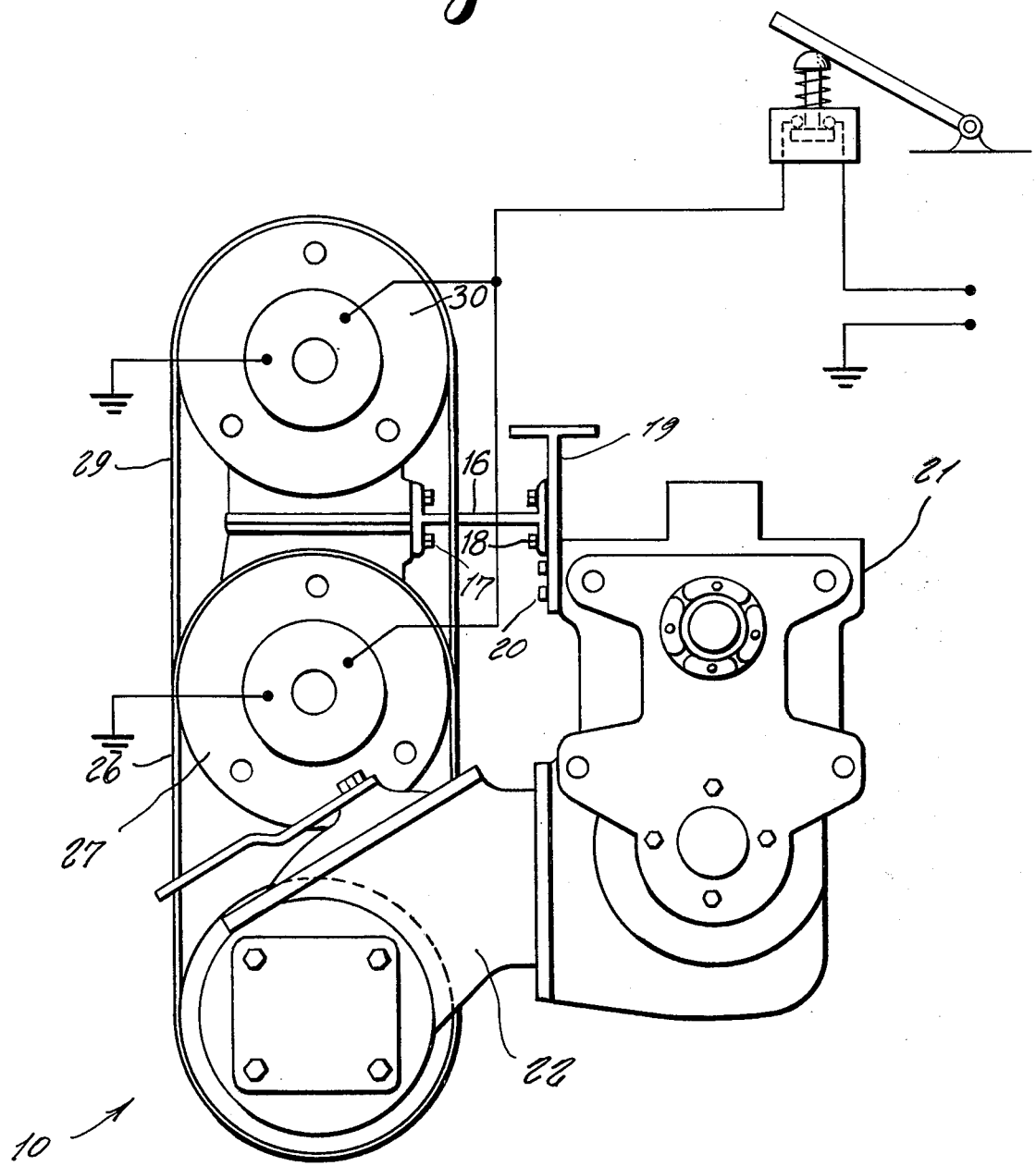
FIG. 2 is an end elevation view thereof and illustrating diagrammatically an electrical circuit therefore.

Referring now to the drawing in detail, the reference numeral 10 represents a transmission powered air conditioner compressors apparatus according to the present invention wherein there are a pair of air conditioner compressors 11 and 12 which may be bolted as shown by bolts 13 extending through flanges 14 integral with housings 15 of the compressors. Both of the compressors 11 and 12 may be supported there from an eye beam 16 to which they are secured by means of bolts 17, the eye beam being mounted by means of bolts 18 to a beam 19 secured rigidly by bolts 20 to a transmission 21. While the above described precise mounting is not a part of the invention, it is here described to show the relationship of parts.

A power take-off 22 in the present invention is secured to the transmission 21, the power take-off including an output drive shaft 23 upon which there are affixed a pair of pulleys 24 and 25. An endless belt 26 is passed around the pulley 25 and around a pulley 27 that is affixed upon a shaft 28 of the air conditioner compressor 12. Another endless belt 29 is passed around the pulley 25 of the power take-off unit and is also passed around a pulley 30 that is mounted upon a shaft 31 of the air conditioner compressor 11. Thus the same comprises a relatively simple assembly.

In order to relieve the force against the power take-off gears that are located within the power take-off unit, and the transmission driven gears, a method of unloading the compressors 11 and 12 can be attained by the use of a starter type switch which disengages the compressor clutch. When the chassis clutch is depressed, the clutch pedal closes the electric circuit, causing the compressor clutch to disengage. If this switch is not used, the pressure is such that the transmission 21 cannot be shifted. This method of driving compressors may be used of truck and bus automatic transmissions also as the manufacture has combined a compressor unload method in truck and bus automatic transmissions.

Thus is provided a transmission powered air conditioner compressors apparatus which has definite advantages by having the air conditioner compressors being installed under and around the transmission.

While various changes may be made in the detailed construction, it is understood that such changes will be within the spirit and scope of the present invention as is defined by appended claims.

What I claim is:

1. In a transmission powered air-conditioner compressors apparatus, the combination of a plurality of air-conditioner compressors, which are installed at a side of a transmission of an automotive truck, such apparatus including a power takeoff unit, between said transmission and said air-conditioner compressors, said power takeoff unit including an output drive shaft, having a pair of pulleys affixed thereupon, one of said pulleys having an endless belt therearound, which extends around a pulley affixed upon a shaft of a first of said air-conditioner compressors, another of said pulleys, of said power takeoff output drive shaft, having an endless belt therearound, extending around a pulley affixed upon a shaft of a second of said air-conditioner compressors, said compressors being supported from an eye beam secured by bolts to a beam secured to said transmission.

2. The combination as set forth in claim 1, wherein said air-conditioner compressors are positioned one above the other.

3. The combination as set forth in claim 2, wherein a method of unloading said compressors in order to relieve force against power take-off gears and transmission driven gears comprises a starter type switch which engages a compressor clutch whereby when a chassis clutch is depressed, the clutch pedal closes an electric circuit causing said compressor clutch to disengage.

* * * * *